May 30, 1967 M. O'BRIEN 3,322,937
ELECTRIC PULSE COUNTER
Filed Sept. 30, 1963
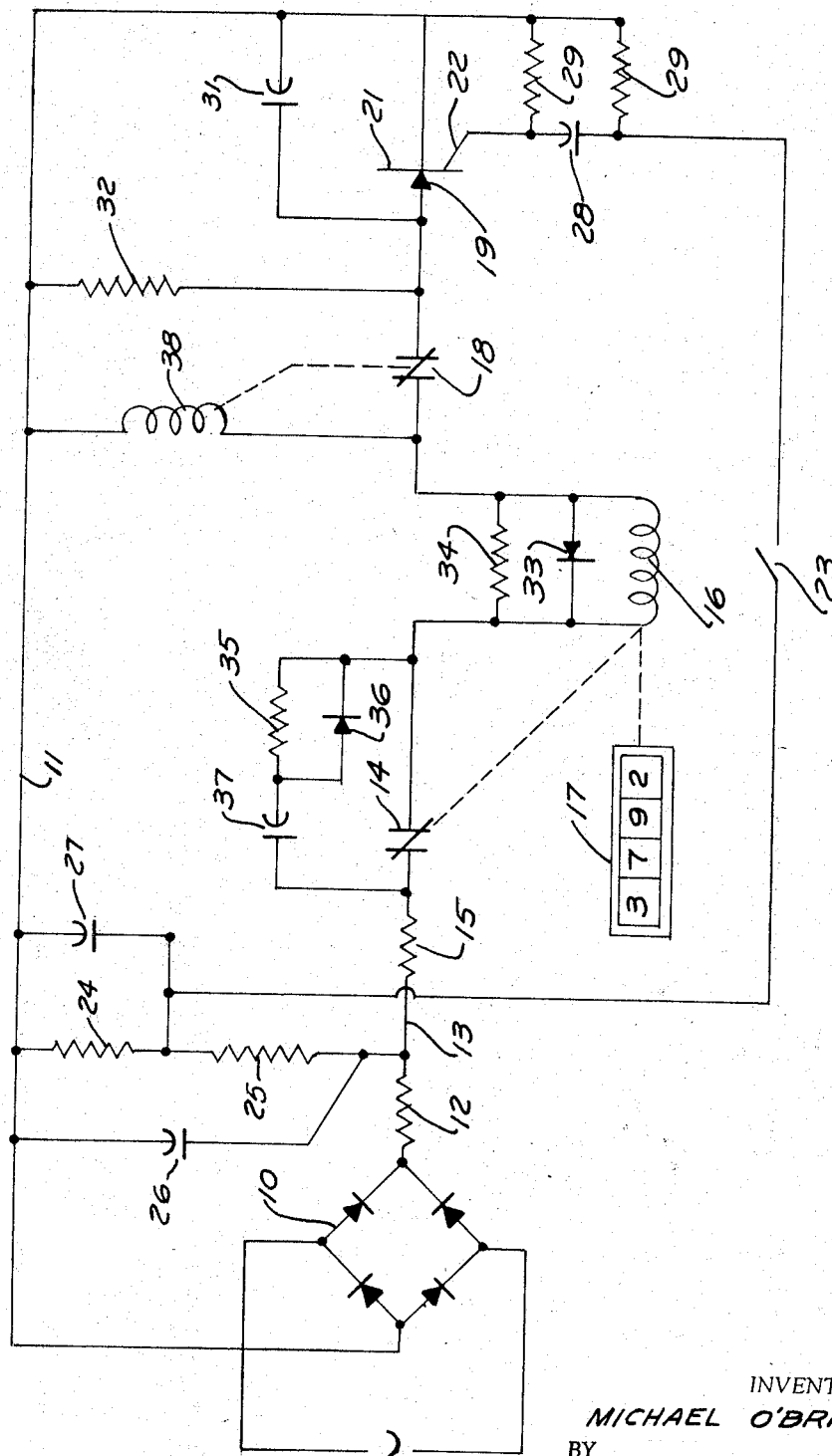
INVENTOR.
MICHAEL O'BRIEN
BY
Bair Freeman & Molinare
ATTORNEYS 3,322,937
ELECTRIC PULSE COUNTER
Michael O'Brien, Grayslake, Ill., assignor to Mangood Corporation, a corporation of Illinois
Filed Sept. 30, 1963, Ser. No. 312,599
1 Claim. (Cl. 235—92)

ABSTRACT OF THE DISCLOSURE

A high-speed counter utilizing a silicone controlled rectifier to trigger power to an activating coil in series therewith. The coil simultaneously activates a mechanical counter and a circuit breaker which opens a circuit to the rectifier and coil, thereby preventing a sustained and damaging current flow through the rectifier, which is then immediately ready to send another pulse. A second slower acting circuit breaker, in series with the rectifier and activating coil, is activated by a second coil connected in parallel with respect to the first activating coil. The second circuit breaker is a safety check, opening only a delayed instant after failure of the first circuit breaker.

---

This invention relates to electric pulse counters and more particularly to a relatively high speed counter using a silicone controlled rectifier as the triggering element.

For various types of operations it becomes necessary to count electrical pulses produced through a switching mechanism as short as 10 microseconds and at speeds up to 2000 pulses per minute. The counter circuit preferably includes a coil which operates a mechanical counter and which may also operate a switch to de-energize the circuit and condition it for a further counting operation.

It is one of the objects of the invention to provide an electric pulse counter capable of high speed operation and which supplies relatively high power pulses to the counter operator coil through a silicone controlled rectifier.

According to a feature of the invention the pulse supply circuit is provided with means for cutting off the triggering pulses sharply after a short interval.

Preferably the triggering pulses are supplied through a capacitor with shunting impedances, such as resistors, on opposite sides thereof to dissipate the pulse.

According to another feature of the invention, the counter switch is protected by a shunt circuit, including a resistor and rectifier connected in parallel with each other and both in series with a capacitor. With this construction the charge on the capacitor when the switch opens will be dissipated rapidly through the rectifier when the switch again closes.

According to still another feature of the invention, the silicone controlled rectifier is shunted by a capacitor and resistor in parallel to protect it against high voltage transients.

The counter coil is protected, according to still another feature of the invention, by a resistor and rectifier connected in parallel across it to dampen back E.M.F.

According to a further feature of the invention, a relay is connected in series with the counter switch to operate a second switch which is also in series with the counter switch in the event of failure of the control switch to operate.

The above and other objects and features of the invention will be more readily apparent from the following description when read in connection with the accompanying drawing, in which:

The single figure is a circuit diagram of an electrical pulse counter embodying the invention.

As shown in the diagram, the counter is powered from a suitable source of alternating current which is rectified in a full wave rectifier indicated generally at 10. The negative side of the rectifier circuit is connected to a line 11 which may constitute in effect the ground or return side of the circuit.

The positive side of the rectifier circuit is connected through a resistor 12 with a line 13. A main control switch 14, which is normally closed, is connected in series in the line 13 through a dampening resistor 15. The switch 14 is adapted to be opened periodically by a counter coil 16, also connected in series in the line 13. The coil 16 when energized will open the switch 14 and will also operate a mechanical counter 17 on which the count of pulses is registered.

The coil is connected through a second normally closed switch 18 with a silicone controlled rectifier having an anode 19, a cathode 21 and a control electrode or gate 22. As shown, the anode 19 is connected to the line 13 and the cathode 21 is connected to the line 11.

In operation of the circuit, as so far described, when a triggering pulse is supplied to the control electrode 22 the silicone controlled rectifier will conduct and current will flow between the anode and cathode. This current will flow through the coil 16 to energize it thereby actuating the counter 17 and simultaneously opening the switch 14. As soon as the switch 14 is opened the circuit is broken so that the coil is de-energized and the silicone controlled rectifier returns to its non-conducting state. It has been found that with this circuit a triggering pulse as short as 10 microseconds is adequate to trigger the silicone controlled rectifier which will turn on in microseconds. It has been found that with the resistors 12 and 15 having a value of 50 ohms the circuit will deliver about 250 ma. at 90 v. This power supplied in short pulses to the counter coil 16 will enable the coil to operate at speeds up to 2000 times per minute without overheating.

As shown, the triggering pulses are supplied under the control of a switch 23 which is connected to the control electrode or gate 22 of the silicone controlled rectifier and to a suitable source of voltage. As shown, the triggering voltage is derived through a voltage divider including resistors 24 and 25 connected in series with each other across the output of the rectifier circuit. A capacitor 26 is connected in parallel with the two resistors and a second capacitor 27 may be connected across the resistor 24 only as shown. The triggering voltage is taken off from the midpoint between the resistors 24 and 25 and may be adjusted to a suitable amount by design to trigger the silicone controlled rectifier.

To dampen and to dissipate rapidly the triggering pulses a capacitor 28 is connected in series in the triggering circuit with resistors 29 connected from each side of the capacitor to the return line 11. In this way, when the switch 23 is temporarily closed it will supply a rapid pulse of short duration to the gate 22 through the capacitor 28 and the pulse will be quickly dissipated through the resistors 29 so that the silicone controlled rectifier will not be caused to fire accidentally.

The silicone controlled rectifier is protected from high voltage transients by means of a capacitor 31 and a resistor 32 connected in parallel with each other across the rectifier. Any high voltage transients occurring in the circuit due to rapid firing and cutting off of the rectifier will be dissipated through the capacitor 31 and resistor 32 so that the rectifier will not be damaged.

To dampen the back E.M.F. generated by the coil 16 when the switch 14 is opened a rectifier 33 and a resistor 34 are connected in parallel with each other across the coil. The rectifier is poled so that it will not pass the normal energizing current in the coil which will flow through the coil to energize it, but will pass counter voltage developed by the coil. This counter voltage will be dissipated in the rectifier and resistor so that it cannot damage the coil or other parts of the circuit.

The counter switch 14 is similarly protected by connecting a circuit across it which includes a resistor 35 and a rectifier 36 connected in parallel with each other and in series with a capacitor 37. This circuit will dampen and dissipate transients occurring on opening of the switch 14 to prevent damage to the switch contacts.

The switch 18 is adapted to be operated by a relay coil 38 which is connected from the line 11 to a point in the line 13 between switches 14 and 18. The coil 38 is normally energized through switch 14 when it is closed and operates at a slower rate than the normal operating rate of the circuit so that it will not be de-energized when the circuit is operating in its normal manner. If the switch 14 should stick in its open position for a period of time longer than the normal operating cycle, the relay 38 will de-energize and will open the switch 18 to interrupt the circuit before it can be damaged. At the same time if the switch 14 should stick closed so that the silicone controlled rectifier will not be energized by its opening, the coil 38 will be shunted by the silicone controlled rectifier when it is in its conducting condition and will open the switch 18 before the circuit can remain in conducting condition long enough to damage any of the parts. The present invention thus provides a circuit capable of high speed operation to count extremely short electrical pulses rapidly and accurately and which is protected against damage so that it can continue to operate reliably over long periods of time.

While one embodiment of the invention has been shown and described herein, it will be understood that it is illustrative only and not to be taken as a definition of the scope of the invention, reference being had for this purpose to the appended claim.

What is claimed is:

An electrical pulse counter comprising a silicone controlled rectifier having an anode, a cathode and a control electrode, a counter actuating coil in circuit with the anode and cathode to be energized when current flows in the circuit, counting means actuated by said coil, a capacitor and resistor in parallel with each other connected in shunt across the anode-cathode path of the rectifier, a resistor and a rectifier connected in parallel with each other and across the coil, the rectifier being poled to oppose flow therethrough of energizing current for the coil, a pulse supply circuit for the control electrode including a D.C. source, a capacitor in series between the positive side of the source and the control electrode, a resistor connected between each side of the capacitor and the negative side of the D.C. source, a switch in the first named circuit connected to the coil to be opened when the coil is energized, a rectifier and a resistor in parallel with each other and in series with a capacitor connected across the switch, a second switch in the first named circuit in series with the first named switch, and a relay connected across the first named circuit in series with the first named switch and connected to the second switch to close it when the relay is energized, the relay being de-energized if the first switch stays open or stays closed with the rectifier conducting for a period of time longer than the normal time of operation of the coil and first switch.

References Cited
UNITED STATES PATENTS

| | | | |
|---|---|---|---|
| 2,639,858 | 5/1953 | Hayes | 235—92 |
| 3,181,032 | 4/1965 | Myers | 317—33 |
| 3,200,304 | 8/1965 | Atkins et al. | 307—88.5 |
| 3,205,411 | 9/1965 | Culbertson | 307—88.5 |

DARYL W. COOK, *Acting Primary Examiner.*

MAYNARD R. WILBUR, *Examiner.*

G. MAIER, *Assistant Examiner.*